United States Patent [19]

Fehr

[11] Patent Number: 5,046,500
[45] Date of Patent: Sep. 10, 1991

[54] DOPPLER FLOW VELOCITY METER

[75] Inventor: Rainer Fehr, Hofstetten, Switzerland

[73] Assignee: Kontron Instruments Holding N.V., Caracao, Netherlands Antilles

[21] Appl. No.: 404,295

[22] Filed: Sep. 7, 1989

[30] Foreign Application Priority Data

Oct. 3, 1988 [CA] Canada .................................. 3684/88

[51] Int. Cl.$^5$ ............................................... A61B 8/06
[52] U.S. Cl. .............................. 128/661.09; 73/861.25
[58] Field of Search ..................... 128/661.07–661.10; 73/861.25

[56] References Cited

U.S. PATENT DOCUMENTS

| | | | |
|---|---|---|---|
| 3,914,999 | 10/1975 | Grandchamp | 128/661.09 |
| 4,216,537 | 8/1980 | Delignieres | 367/88 |
| 4,270,191 | 5/1981 | Peynaud | 367/91 |
| 4,334,543 | 6/1982 | Fehr | 128/661.09 |
| 4,434,669 | 3/1984 | Roberts et al. | 73/861.25 |
| 4,534,357 | 8/1985 | Powers | 73/861.25 X |
| 4,780,837 | 10/1988 | Namekawa | 128/661.09 X |

FOREIGN PATENT DOCUMENTS 0166392 6/1981 European Pat. Off. .

Primary Examiner—Francis Jaworski
Attorney, Agent, or Firm—Morgan & Finnegan

[57] ABSTRACT

A Doppler measuring device for measuring the flow velocity of a fluid which carries particles which reflect ultrasonic waves is described. The device includes an ultrasonic transducer for insonating the fluid with ultrasonic wave pulses in response to corresponding transmit pulses supplied to the transducer at a predetermined pulse repetition rate. A transmitter connected to a transducer and adapted to produce transmission pulses which excite the transducer to deliver the ultrasonic wave pulses is present. The device also includes a receiver connected to the transducer to receive and process echo signals corresponding to at least two groups of echo waves reflected by particles in the fluid, and an evaluator connected to the output of the receiver to derive from the Doppler information obtained by the receiver an output signal corresponding to the flow velocity.

4 Claims, 15 Drawing Sheets

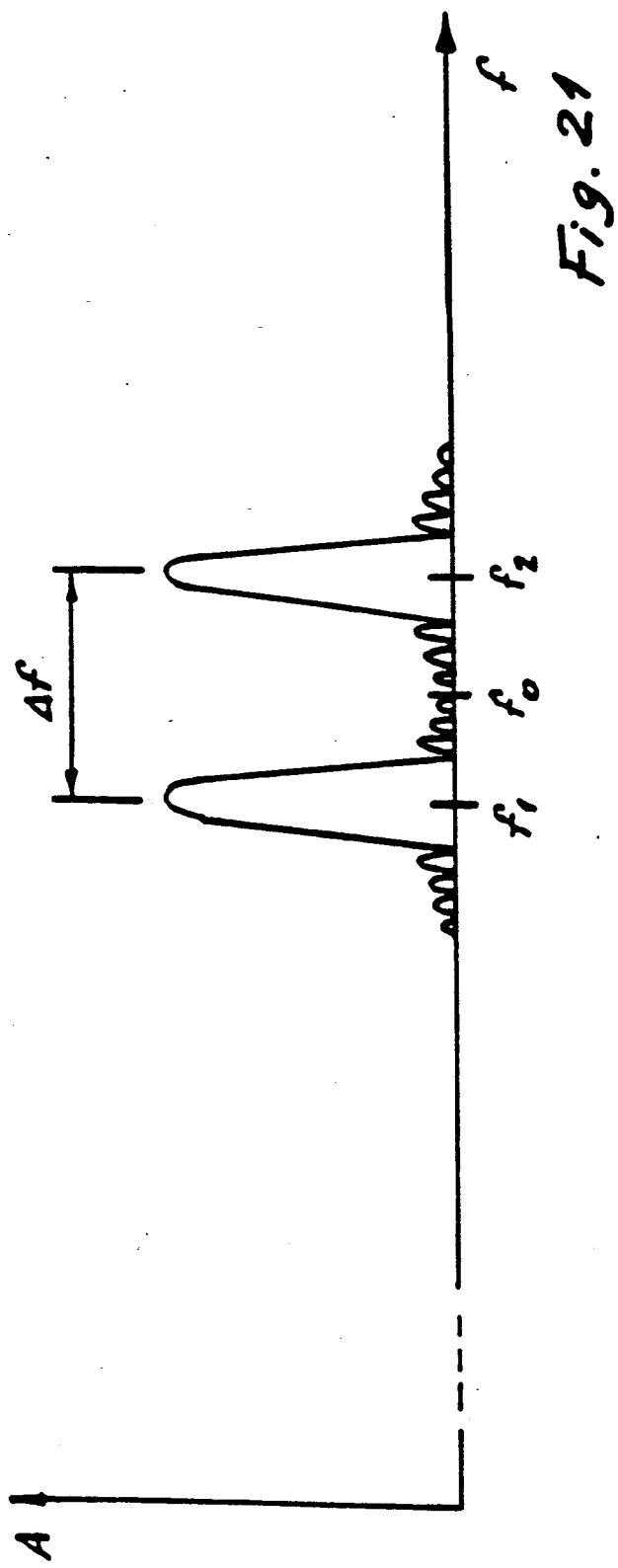

DOPPLER FLOW VELOCITY METER

FIELD OF THE INVENTION

The invention relates to a Doppler measuring device for measuring flow velocities of fluid which carries particles which reflect ultrasonic waves.

BACKGROUND OF THE INVENTION

An device of the kind referred to has been described in the European patent application having the publication number 0 166 392. This device can theoretically provide a considerable amplification of the measurement range. However, for this advantage to be useful in practice the sensitivity of this known device needs to be increased considerably.

It is therefore the object of the invention to increase the sensitivity of a Doppler measuring device such as the one referred to—i.e., to increase the signal-to-noise ratio—so that relatively weak useful signals can be considered in the measurement of flow velocity.

SUMMARY OF THE INVENTION

The novel Doppler measuring device according to the invention comprises:

(a) transmitter means for producing transmit pulses at a predetermined pulse repetition rate, said transmit pulses having a periodic sequence with a frequency spectrum of at least two adjacent but separate frequency bands;

(b) ultrasonic transducer means connected to the transmitter means for receiving said transmit pulses which excite the transducer means to produce corresponding ultrasonic wave pulses to insonate the fluid and thereby the particles carried by the fluid and to produce at least two groups of corresponding echo waves, said echo waves being received by the ultrasonic transducer means and delivered as corresponding echo signals;

(c) receiver means connected to the ultrasonic transducer means and having a input end, an output end, and separate signal processing paths for receiving the echo signals from the ultrasonic transducer means and for processing adjacent but separate frequency bands of the echo signals in each of the separate signal processing paths to produce Doppler information; and (d) evaluator means connected to the output end of the receiver means for evaluating the echo signals received from the receiver means to determine the flow velocity of the fluid.

The Doppler measuring device according to the invention greatly increases sensitivity. This is very advantageous in color flow mapping—i.e., the representation of different velocity zones by different colors. The increased sensitivity facilities a finer subdivision and therefore a clearer representation of flow conditions, for example, in a blood vessel. According to the invention, the increased sensitivity is produced more particularly because most of the energy of the transmitted ultrasonic pulses is concentrated precisely in the frequency bands in which the echo signals are processed in the receiver in a separate path for each band.

BRIEF DESCRIPTION OF THE INVENTION

Some embodiments of the invention will be described hereinafter with reference to the accompanying drawings wherein:

FIG. 21 is a diagrammatic representation of the frequency spectrum of a sequence of transmit pulses having the waveform of FIG. 19 or FIG. 20.

DETAILED DESCRIPTION OF PREFERRED EMBODIMENTS

Figure 1:
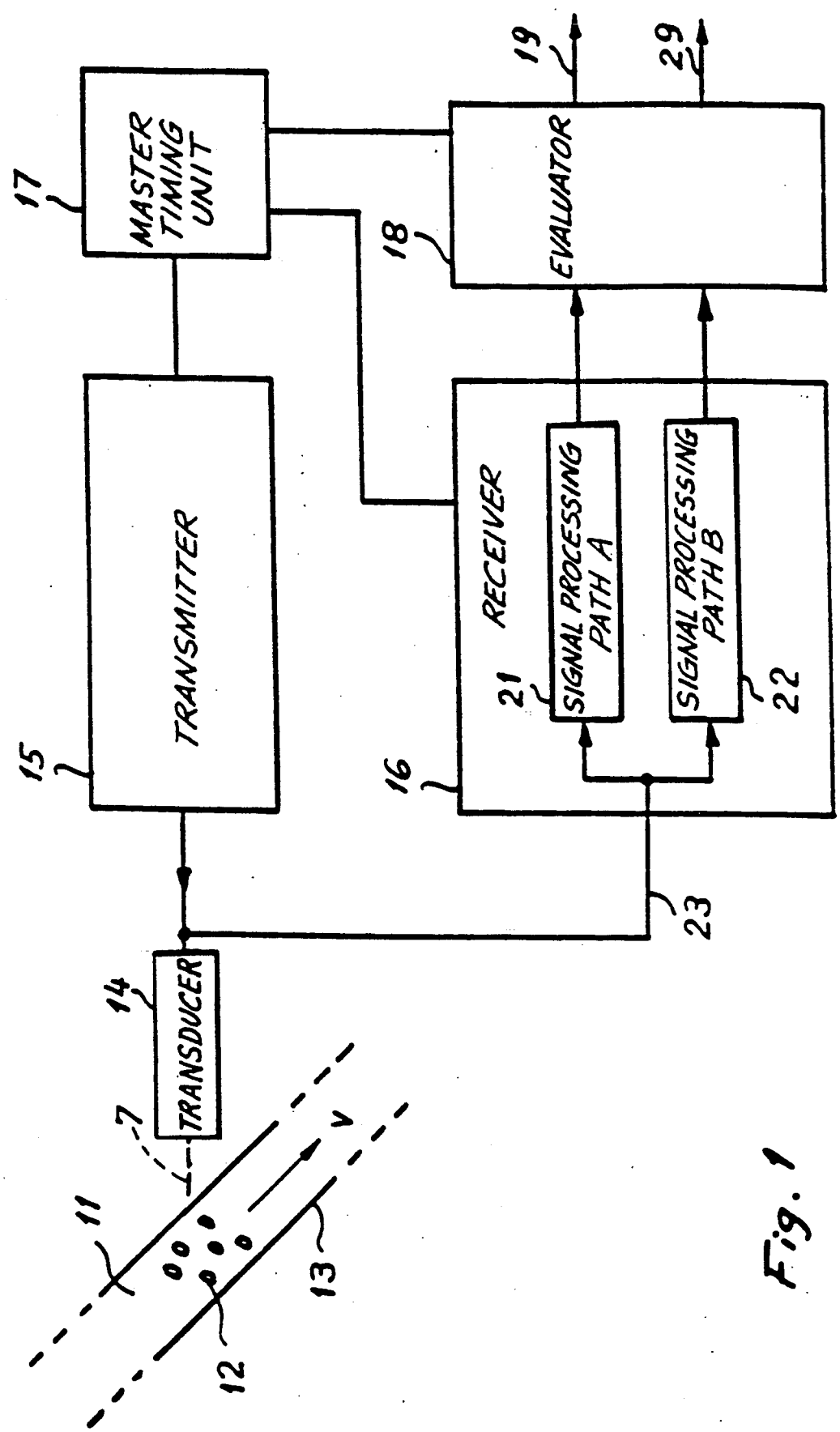
FIG. 1 is a block schematic diagram of a Doppler measuring device.

FIG. 1 shows the block schematic diagram of a Doppler measuring device for measuring flow velocities of a fluid 11 which carries particles 12 which reflect ultrasonic waves. The fluid 11 can be, for example, the blood flowing through a blood vessel. The principle of such a device has been described in DE-OS DE-A-2 406 630 and in the corresponding US-A-3 914 999. According to this known principle a fluid 11 flowing, for example, through a tube 13 is insonated by at least two consecutive ultrasonic pulses which are delivered by a transducer 14, the echoes, from reflectors, for example, particles, in the fluid along the ultrasonic beam are received by the same transducer 14 with a shift of the corresponding Doppler frequency and, from the phase differences between echoes of equal transit time of the first and second pulses transmitted, appropriate signal processing in an evaluator 18 produces an output signal whose amplitude variation with time corresponds to the velocity profile of the fluid in the cross-section under examination.

As shown in FIG. 1 the device comprises an ultrasonic transducer 14, a transmitter 15, a receiver 16, a master timing unit 17 and an evaluator 18.

The transducer 14 insonates the fluid 11 with ultrasonic wave pulses, in the direction indicated by a straight line 7 shown in phantom lines, in response to corresponding transmit pulses supplied to the transducer 14 at a predetermined pulse repetition rate. The transducer 14 also receives the echo waves reflected by particles in the fluid and delivers corresponding echo signals. The transducer 14 is, for example, an ultrasonic transducer having the following technical characteristics:

The transmit frequency is preferably in the region of 3.0 MHz;

The resonance frequency of the ceramic is 3.2 MHz;
The diameter of the circular ceramic is 13 mm;
The radius of curvature of the ceramic is 120 mm, and
The distance between the transducer and the boundary between the short-range field and the long-range field is 88 mm.

The transmitter 15 is connected to the transducer 14 and is effective to produce transmit pulses which excite the transducer to output the ultrasonic wave pulses.

The receiver 16, which is also connected to the transducer 14, processes echo signals corresponding to at least two groups of echo waves reflected by particles in the fluid in response to a first and second transmitted wave pulse. Adjacent but separate frequency bands are each processed in a separate signal-processing path 21, 22 in the receiver 16.

The evaluator 18, which is connected to the outputs of the receiver 16, derives from the Doppler information obtained by the receiver 16 at least one output signal containing flow velocity information.

The master timing unit 17 produces all the control and timing signals necessary for a programmable operation of the Doppler apparatus. The unit 17 is therefore basically a programmable digital signal generator. The main functions of the timing unit 17 are as follows:

It controls the transmitter 15 by determining the instant and duration of the transmit pulses;

It delivers all the timing signals for the receiver 16 and thus controls the flow of signals therethrough, and It delivers the timing signals for the evaluator 18 and thus controls the flow of signals therethrough.

Figure 2:
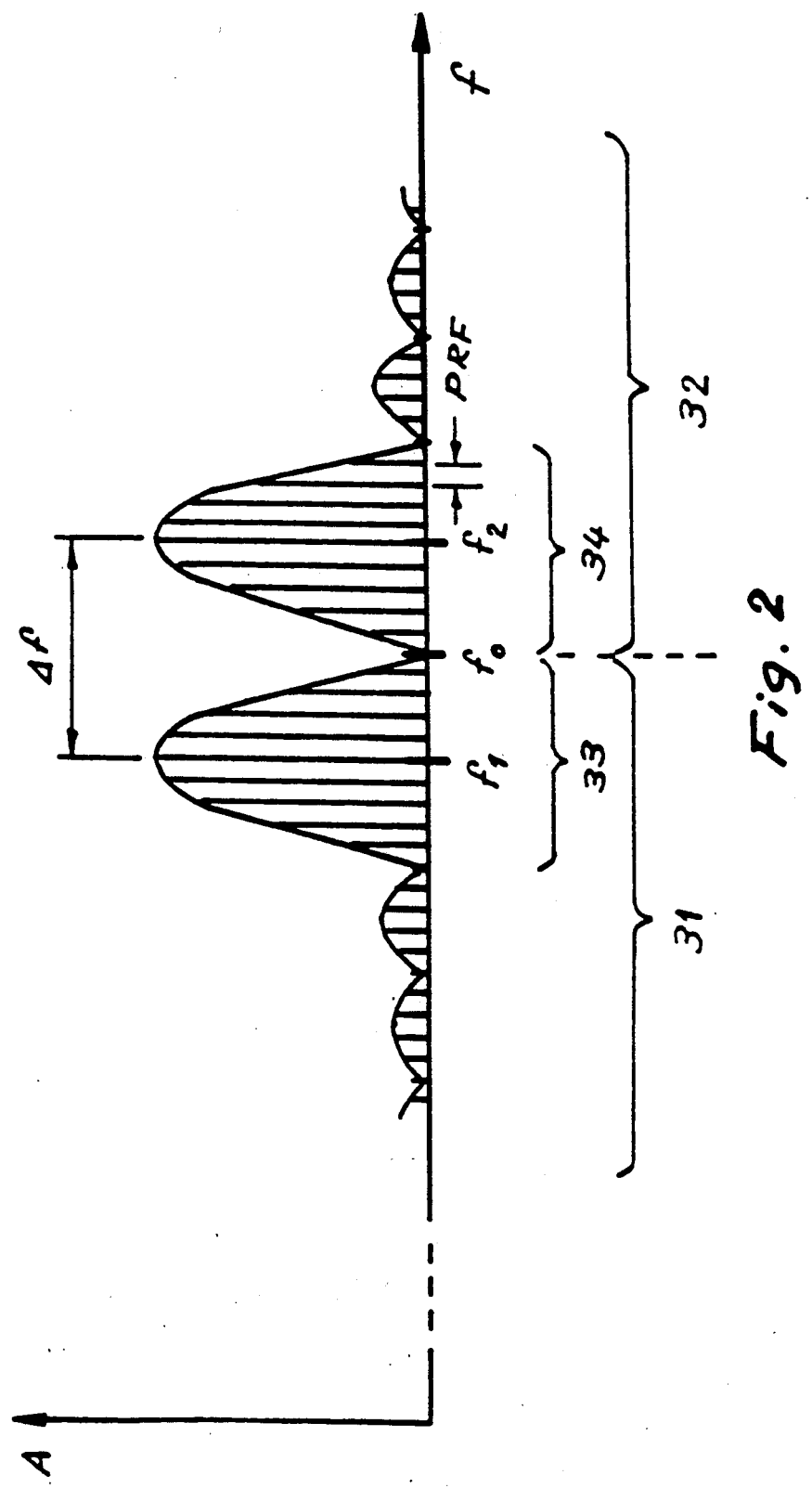
FIG. 2 shows the frequency spectrum of a sequence of transmitted pulses having the waveform of FIG. 3.

According to the invention, the transmitter 15 is so devised that the frequency spectrum of the periodic sequence of transmit pulses it produces comprises two adjacent but separate frequency bands 31, 32 which are shown in FIG. 2. Since the transmit pulses are transmitted periodically at the pulse repetition rate PRF, the frequency spectrum of the transmit signal comprises a frequency line grating which is shown in FIG. 2 and which has a grating distance of PRF. As can be gathered from FIG. 2, the shape of the frequency spectrum of the transmit signal is such that most of the transmitted energy is concentrated around two frequencies $f_1$ and $f_2$ in these frequency bands.

The frequency bands 31, 32 of FIG. 2 are so close together as to be adapted to be insonated by the same transducer and to experience substantially the same tissue attenuations. For example, the frequencies $f_0$, $f_1$, $f_2$ illustrated in FIG. 2 have the following values: $f_0 = 3.2$ MHz, $F_1 = 2.95$ MHz and $F_2 = 3.45$ MHz.

As can be seen in FIG. 2, according to the invention preferably most of the transmitted energy is concentrated in two adjacent frequency bands 33, 34, the carrier frequency $f_0$ defining the boundary between the bands while $f_1$ is the central frequency of the band 33 and $f_2$ is the central frequency of the band 34.

The separation between the frequencies $f_1$ and $f_2$ is defined as the frequency interval $\Delta f$. Because $f_1$ and $f_2$ are symmetrical of $f_0$, $f_2 - f_0 = f_0 - f_1 = \Delta f/2$.

Figure 3:
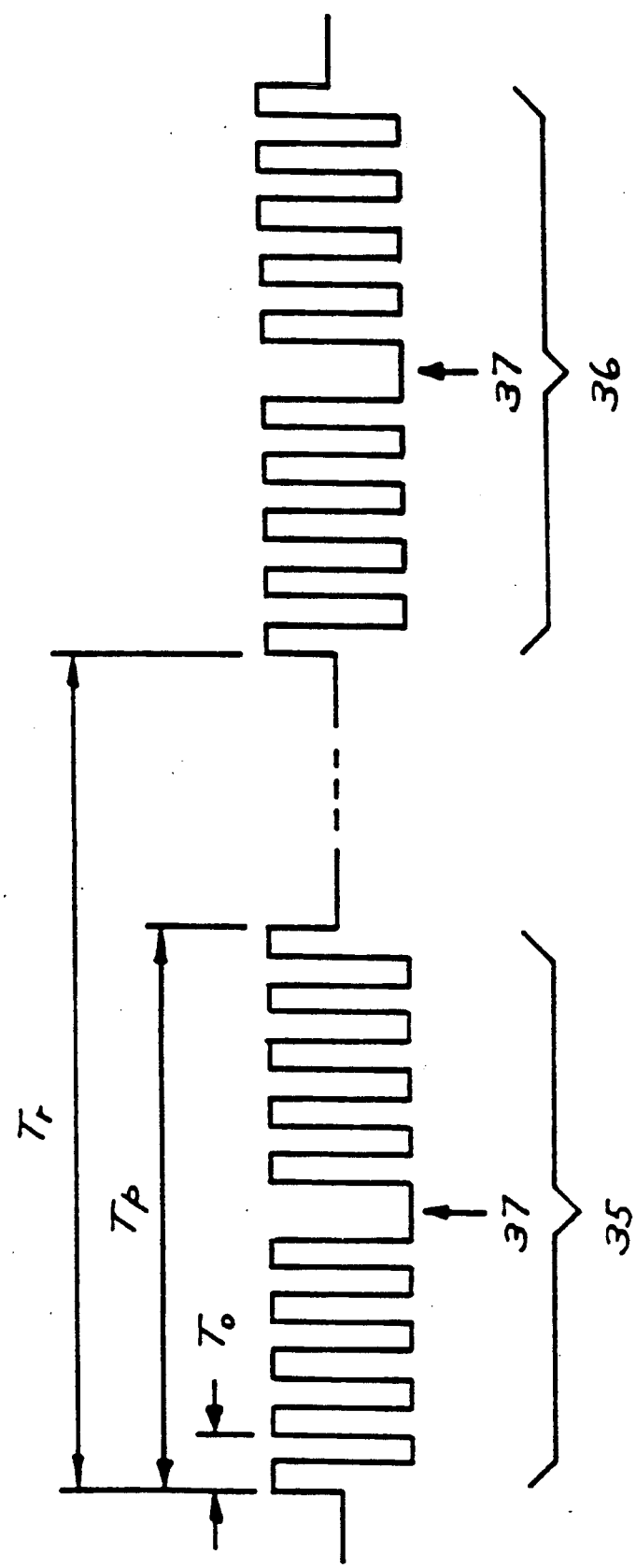
FIG. 3 illustrates transmit pulses.

FIG. 3 shows an example of two consecutive transmit pulses 35, 36. The transmitted sequence of such pulses has a transmit spectrum in accordance with FIG. 2. Each of the pulses 35, 36 mainly comprises a rectangular signal of frequency $f_0$ so that the period of one oscillation of such signal of period $T_0$ is $1/f_0$. The duration of a transmit pulse is $T_p$ and is, for example, 6 microseconds. The separation $T_r$ between consecutive transmit pulses is, for example, 250 microseconds, corresponding to a pulse repetition rate PRF of 4 kHz. The transmit pulses supplied to the transducer have, for example, a voltage of between 50 and 100 volts.

As can be gathered from FIG. 3, each transmit pulse deviates from a periodic rectangular signal in that the signal has at its center a place 37 where a phase reversal occurs. Such a phase reversal is necessary for the periodic sequence of transmit pulses to have the frequency spectrum shown in FIG. 2.

Figures 19, 20:
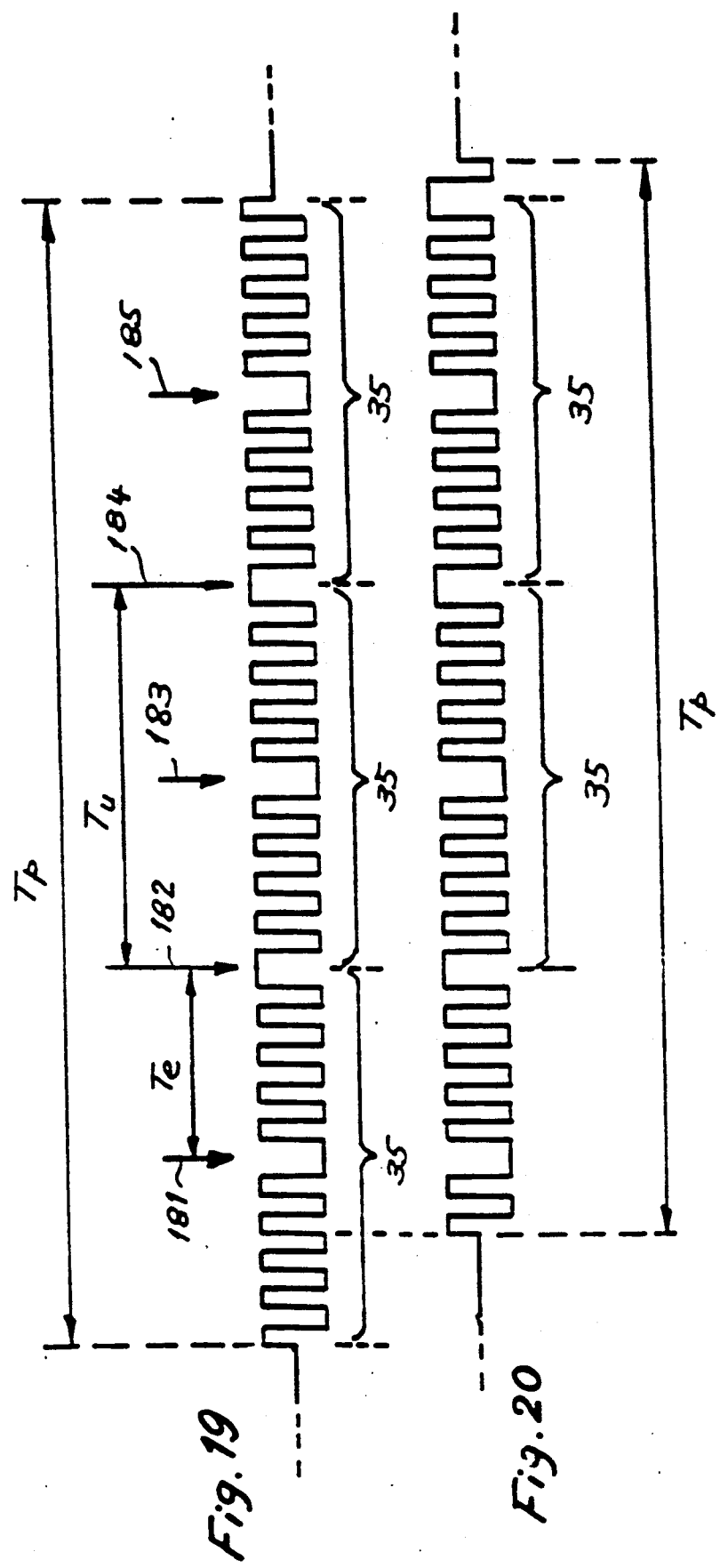
FIGS. 19 and 20 show transmit pulses.

FIGS. 19 and 20 show two other examples of transmit pulses according to the invention. The transmit pulse of FIG. 19 is made up of three transmit pulse elements each having the pattern of the transmit pulse 35 of FIG. 3. The transmitted pulse of FIG. 20 is made up of two whole transmit pulse elements having the pattern of the pulse 35 shown in FIG. 3 and at its start and end parts of such an element.

Since the pulse of FIG. 20 contains fewer than three whole transmit pulse elements, it is of shorter duration than the pulse of FIG. 19. As can be gathered from FIG. 20, the transmit pulse can start on any desired flank of a transmit pulse element.

The transmit pulses of FIGS. 19 and 20 comprise phase reversal positions 181—185 each of which corresponds to the phase reversal position 37 of FIG. 3, while the phase reversal positions 182, 184 arise by the combination of two signal pulse elements. In practice the transmit pulses of FIG. 19 and FIG. 20 are produced by time segmenting of a signal which is in itself continuous and which has periodically distributed phase reversal positions.

FIG. 21 is a diagrammatic view of the frequency spectrum of a sequence of transmit pulses having the waveform shown in FIG. 19 of FIG. 20. To simplify the illustration only the envelope curve of the frequency line raster, which forms the frequency spectrum as in FIG. 2, is shown. As a comparison between the transmit spectrum of FIG. 2, for a sequence of transmit pulses each containing just a single transmit pulse element, and the frequency spectrum of FIG. 21, for a sequence of transmit pulses each containing a number of elements, will show, the use of the pulses according to FIGS. 19 and 20 helps to achieve a more intense concentration of the energy of the transmitted ultrasonic waves in relatively narrow frequency bands around the frequencies $f_1$ and $f_2$, the spacing $\Delta f$ being the same as in FIG. 2.

As in FIG. 2 the reference $\Delta f$ denotes the spacing between $f_1$ and $f_2$.

As shown in FIG. 19, the period of the phase reversal positions—i.e., the period of time between similar phase reversal positions—has the reference $T_u$, $T_u$ being $2/\Delta f$. This also applies to the transmit pulse according to FIG. 20.

The phase reversal positions must be disposed at regular time intervals $T_e = T_u/2$ in a pulse of the kind shown in FIGS. 19 or 20.

When the transmit signal is in the form of a sequence of transmit pulses of duration $T_p$ and, as is the case in FIGS. 19 and 20, $T_p$ is much greater than $T_u$, the position of the start and end of the transmit pulse relative to the position of the phase reversals positions in it is not critical.

The pulse duration $T_p$ is preferably greater than the phase reversal position period $T_u$. To ensure the spectrum of the transmit signal in accordance with FIG. 2, $T_p$ must be greater than $T_u$. The greater $T_p$ relative to $T_u$, the greater is the concentration of transmitted energy around the side band center frequencies $f_1$ and $f_2$ in the frequency spectrum of the transmit signal.

Figure 4:
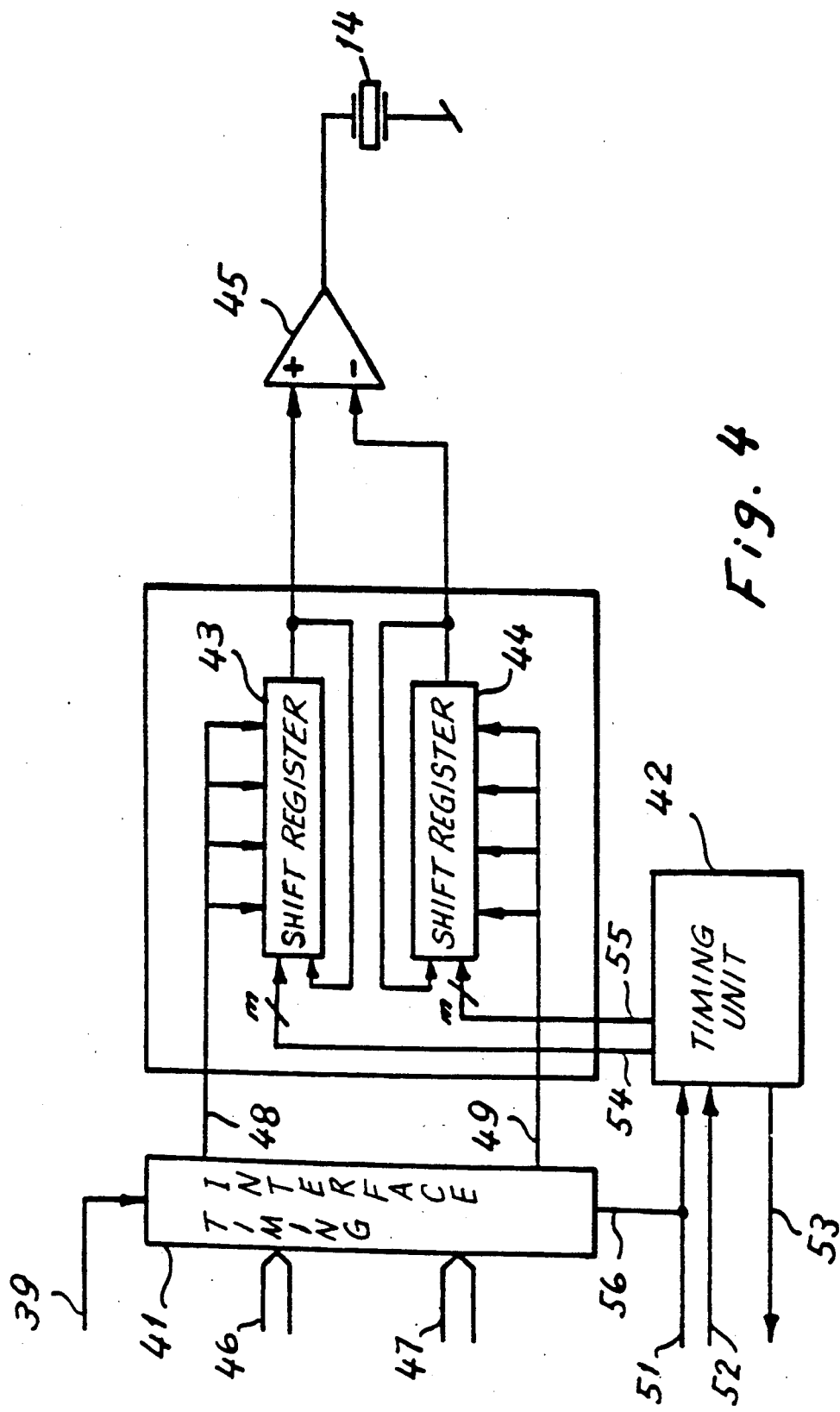
FIG. 4 is a block schematic diagram of a first embodiment of the transmitter 15 illustrated in FIG. 1.

FIG. 4 shows a first embodiment of the transmitter 15 illustrated in FIG. 1. This embodiment mainly comprises digital units. The transmitter circuit includes a timing interface 41, a timing unit 42, two shift registers 43, 44 and a power amplifier 45 whose output is connected to the transducer 14 illustrated in FIG. 1. The circuit of FIG. 4 produces transmit pulses of the kind shown in FIG. 3, the transmitted periodic sequence of the transmit pulses having the frequency spectrum of FIG. 2.

The necessary signals are supplied to the interface 41 by way of lines 39, 56, 51 and address bus 46 and a data bus 47. The interface 41 is connected to the registers 43, 44 by way of respective lines 48, 49. The outputs of the registers 43, 44 are each connected to a respective input of the amplifier 45. The unit 42 is connected by way of lines 51-53 to the master timing unit 17 illustrated in FIG. 1. The unit 42 is also connected by way of a line 56 to the interface 41 and by way of lines 54, 55 to the respective registers 43, 44.

The registers 43, 44 are of identical construction and have corresponding connections but are loaded with different but complementary bytes.

Figure 5:
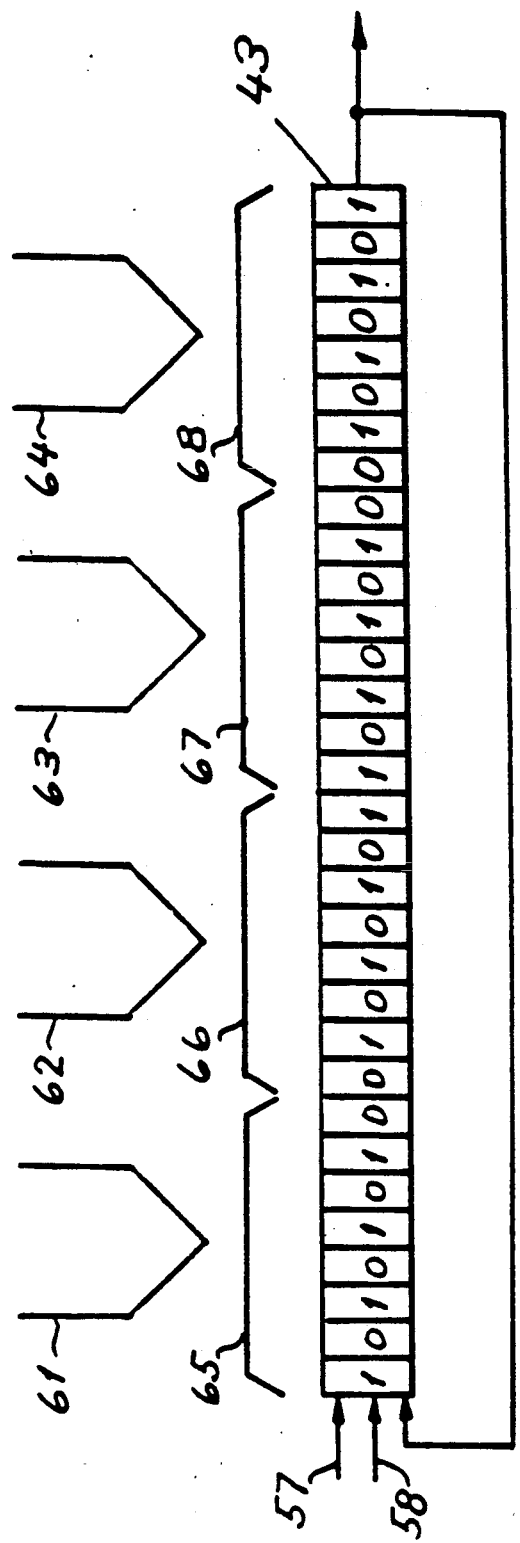
FIG. 5 is a block schematic diagram of the register 43 illustrated in FIG. 4.

FIG. 5 is a diagrammatic view of the register 43 of FIG. 4. As shown in FIG. 5, four bytes (words) 65-68 in the register 4 are loaded by way of corresponding buses 61-64 into the register 43. The content of these bytes is shown in the storage cells of the register 43 of FIG. 5.

As can be gathered from FIG. 4, each of the registers 43, 44 has a feedback from its output to its input. As will be described hereinafter in greater detail this feature is significant for convenient operation of the transmitter circuit of FIG. 4. Another important consideration is that the contents of the registers 43, 44 are complementary—i.e., for example, 101010 . . . is stored in the register 43 and 010101 . . . in the register 44.

The operation of the transmitter circuit of FIGS. 4 and 5 will be described with reference to the signal diagrams of FIG. 6.

The interface 41 is effective to program the unit 42 and registers 43, 44. To this end the interface 41 obtains addresses and data by way of buses 46, 47 respectively and by way of the line 39, the associated strobe signal 72 in FIG. 6 from the decoded microprocessor bus of the main system of FIG. 1. The signal 72 is a timing signal initiating loading of the bytes into the registers 43, 44. To time the loading of the bytes in the registers 43, 44 the interface 41 receives a further signal 71 via lines 51, 56. The loading of the intended byte is possible only in the period of time 171 in which the signal 71 has the state shown. To time the loading of the intended bytes in the registers 43, 44 a further signal 73 is produced in the unit 42 in response to the signal 71 and is supplied to the registers via lines 54, 55 respectively. Also, the unit 42 receives via the line 52 a timing signal the unit 42 produces a corresponding timing signal 74 which is supplied via lines 54, 55 to the respective registers 43, 44.

Figure 6:
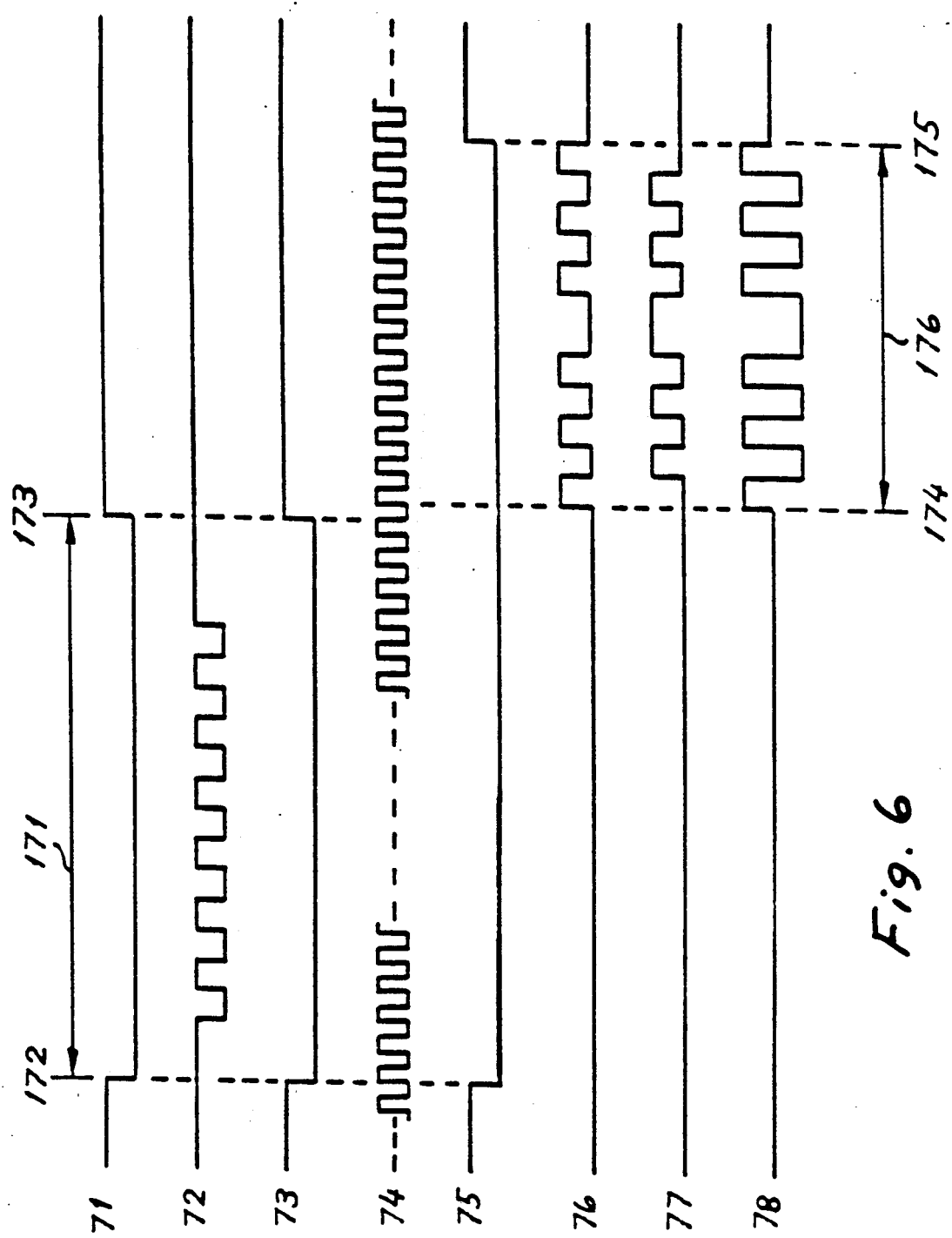
FIG. 6 illustrates signal diagrams to explain the operation of the transmitter of FIG. 4.

As shown in FIG. 6, the time interval 71 for loading the registers 43, 44 extends between the instants 172 and 173, at each of which there is a change of state of the signals 71, 73. After the period 171 a shift occurs in the registers 43, 44, the shifts starting with the next front flank of the timing signal 74 at the instant 174. This shift leads to the production at the outputs of the registers 43, 44 of a respective output signal 76, 77. The power amplifier 45 of FIG. 4 forms the difference between the output signals 76 and 77 to produce a transmit pulse 78 having the required pattern of FIG. 3.

As shown in FIG. 6, the shift event in the registers 43, 44 continues for a time 176 lasting from the instant 174 to than instant 175. The duration of the period 176 and, therefore, the duration of the pulse 78 is determined by a counter which is present in the unit 42 and which at the instant 175 alters a signal 75 marking the end of the pulse 78. The signal 75 is transmitted via a line 53 from the unit 42 to the master timing unit 17 of FIG. 1.

The registers 43, 44 are shift registers having the structure shown for the register 43 in FIG. 5. As shown in FIG. 5, each such register has 4×8 storage cells for one byte each and are loaded by the interface 41 with four bytes each containing eight bits. As previously described, the 32-bit long sample (transmit sample) is then shifted to an output of the amplifier 45. Since the register output is looped back to its input, shifting can continue for as long as required.

The transmitter circuit of FIG. 4 just described is preferred because it is made up of relatively inexpensive digital units and because it facilitates a more flexible devising of the frequency spectrum of the transmitted pulses by relatively easy alterations of the operating parameters. However, instead of the circuit illustrated in FIG. 4 a transmitted circuit of the kind shown in FIG. 7 can be used to produce the transmitted pulses, the latter circuit mainly comprises an AM modulator, an electronic switch and a power amplifier.

Figure 7:
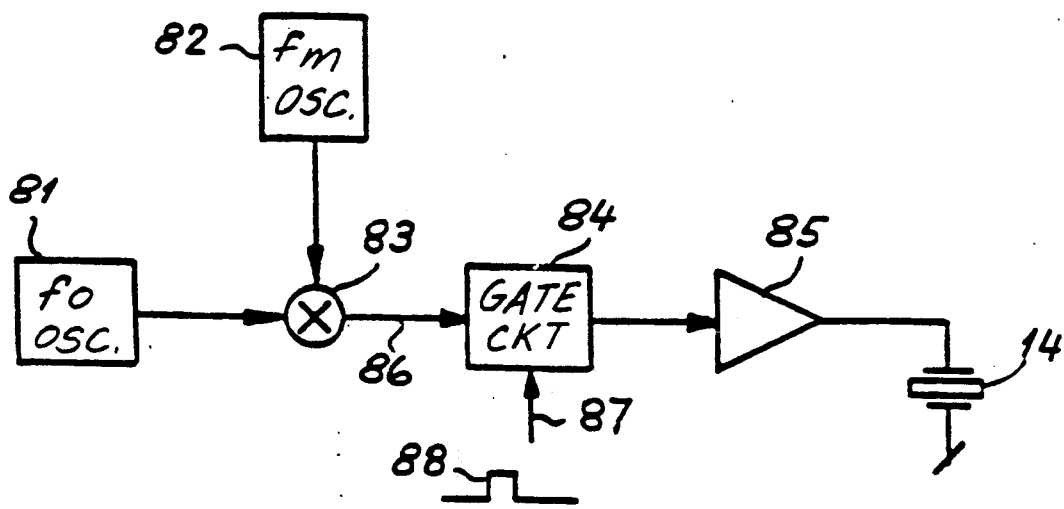
FIG. 7 is a block schematic diagram of a second embodiment of the transmitter 15 of FIG. 1.

The transmitter circuit of FIG. 7 is made up of the following analog functions units: a carrier frequency oscillator 81 producing a carrier signal of frequency $f_O$, and a modulation frequency oscillator 82 producing a modulation signal of frequency $f_m = \Delta f/2$, $f_m$ being 250 kHz in the present example. The circuit of FIG. 7 is made up of a multiplier 83, a controllable electronic gate circuit 84 and a power amplifier 85 whose output is connected to the transducer 14 illustrated in FIG. 1. The carrier signal output of the oscillator 81 is multiplied in the multiplier 83 with the modulation signal produced by the oscillator 82 in order to produce an output signal shown in FIG. 8. As can be gathered therefrom, the resulting amplitude-modulated signal is the result of a conventional AM modulation.

This amplitude-modulated signal is supplied via a line 86 to an input of the gate circuit 84. A pulse 88 delivered by the master timing unit 17 of FIG. 1 is supplied via a line 87 to a second input of the gate circuit 84 in order to gate the amplitude-modulated signal at the input of the gate circuit 84 for particular periods of time. Transmit pulses are therefore produced which after amplification in the amplifier 85 are supplied to the transducer 14. The duration of the pulse 88 of FIG. 7 determines the duration of the transmitted pulse.

Figure 8:
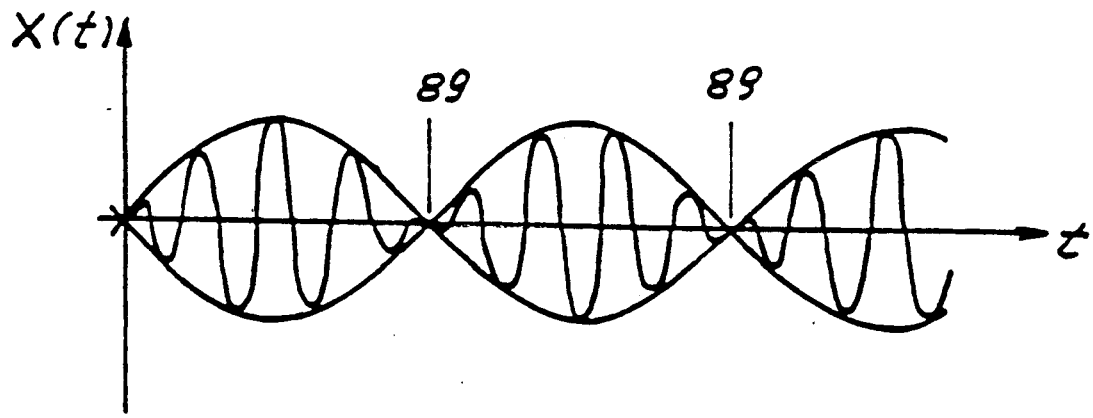
FIG. 8 is a diagram of the signal at the input of the gate circuit 84 of FIG. 7.

As will be apparent from FIG. 8, the amplitude-modulated waveform at the input of the gate circuit 84 has periodic phase reversal positions 89. Through the agency of appropriate time relationships between the pulse 88 of FIG. 7 and the signals output by the oscillators 81, 82, the resulting transmit pulses at the output of the gate circuit 84 contain such a phase reversal position 89. This ensures (as in the case of the transmit pulses of FIG. 3) that the transmit pulses supplied to the transducer have a frequency spectrum in accordance with FIG. 2.

A description will be given hereinafter first of the principle of the receiver 16 with reference to FIGS. 9-15, whereafter a preferred embodiment of the receiver will be described with reference to FIGS. 16-18.

When a flowing liquid is insonated with ultrasonic wave pulses, a structure moving with the liquid, for example, blood particles of the blood flowing through a vessel, produces a frequency shift and a phase shift in the received echo because of the Doppler effect.

According to a known principle the flow velocity v at any place along the ultrasonic beam is determined by a phase comparison at two different instants of time. To this end, information about the phase of the echo signal is derived from the received echo signals at each such instant. The echo signal $f_e$ of a particular position can be represented by the following term in which $\omega_o$ is $2\pi f_o$ and $\omega_d$ is $2\pi f_d$, $f_o$ being the transmit frequency and $f_d$ being the echo signal frequency shift produced by the doppler effect:

$$f_e = \cos(\omega_o + \omega_d)t$$

Figure 9:
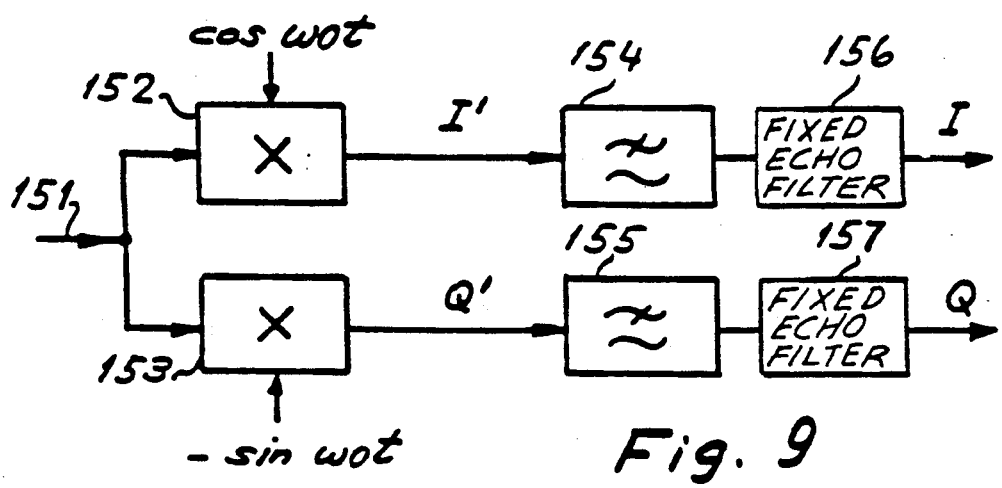
FIG. 9 is a block schematic diagram of a Doppler signal detector.

According to the known principle the echo signal $f_e$ is supplied via a line 151 to the input of a quadrature demodulation stage according to FIG. 9. Such stage comprises the arrangement, shown in FIG. 9, of two analog multipliers 152, 153, two respective low-pass filters 154, 155 and two respective fixed-echo filters 156, 157 (known in the radar art as a moving target indicator). These filters are effective to suppress fixed echo components of the demodulated echo signals. As shown in FIG. 9, the echo signal $f_e$ is multiplied in the multiplier 152 by a signal $\cos \omega_o t$. The result is the production at the output of the multipliers of respective output signals I' and Q' which are defined as follows:

$$I' = \cos\omega_o t \cdot \cos(\omega_o + \omega_d)t = 1/2[\cos(2\omega_o + \omega_d)t + \cos\omega_d t]$$
$$Q' = -\sin\omega_o t \cdot \cos(\omega_o + \omega_d)t = -1/2[\sin(2\omega_o + \omega_d)t - \sin\omega_d t]$$

After filtering of the signals I' and Q' in the filters 154, 155 respectively and in the fixed echo filters 156, 157 respectively the following signals I and Q respectively are delivered at the output of the quadrature demodulation stage of FIG. 9:

$$I = \tfrac{1}{2}\cos \omega_d t$$

and $$Q = \tfrac{1}{2}\sin \omega_d t$$

Figure 10:
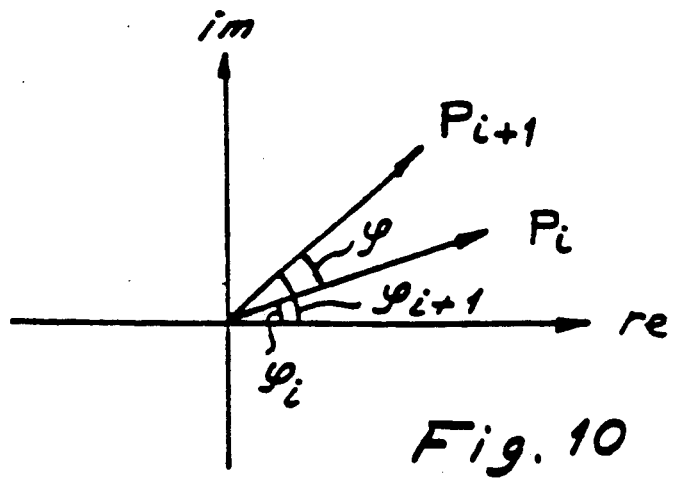
FIG. 10 is a vector diagram.
Figure 11:
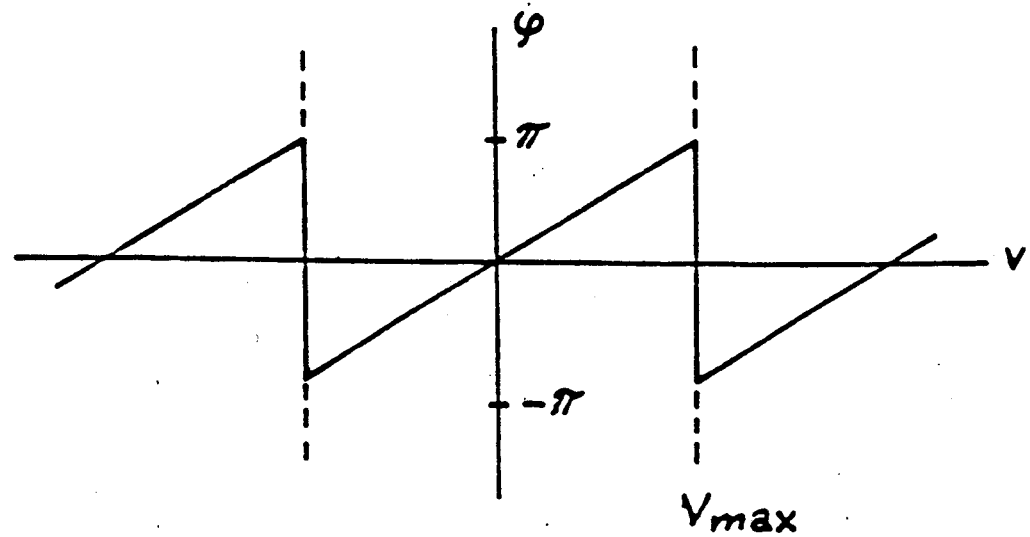
FIG. 11 shows the phase pattern of a Doppler signal detector of FIG. 9.

To determine the flow velocity v from $\omega_d$ or a particular place on the ultrasonic beam, at least two ultrasonic pulses must be transmitted at the time spacing $T_r$, $T_r$ being equal to 1/PRF and PRF being the pulse repetition rate of the transmitted ultrasonic pulses. Consequently, two (or more) signal pairs $I_i$, $Q_i$ derived from the echo signals are formed by the quadrature demodulation stage of FIG. 9 and represent the Doppler signal of a particular place as sampled at the pulse repetition rate. Based on the signal pairs $I_i$, $Q_i$ a complex vector $P_i = I_i + jQ_i$ can be defined which rotates through an angle $\phi$ at each sampling. Since $\omega = d\phi/dt$, $\phi$ is proportional to $\omega_d$. FIG. 10 shows the complex vectors $P_i$ and $P_{i+1}$, their phase angles and the phase difference between $P_i$ and $P_{i+1}$.

Using the value pairs $I_i$, $Q_i$, the direction and speed of rotation of the complex vector $P_i$ can be determined by the calculation of $\phi$. As can be gathered from the phase/frequency characteristic, show in FIG. 11, of the receiving system of FIG. 9, $\phi$ is—except for a constant factor—a measure of the detected flow velocity v and delivers correct results for v for values thereof within the limits $\pm V_{max}$ fixed by the sampling theorem.

Also, a conjugatedly complex vector $P^*_i = I_i - jQ_i$ can be defined with reference to each of the value pairs $I_i$, $Q_i$.

Figure 12:
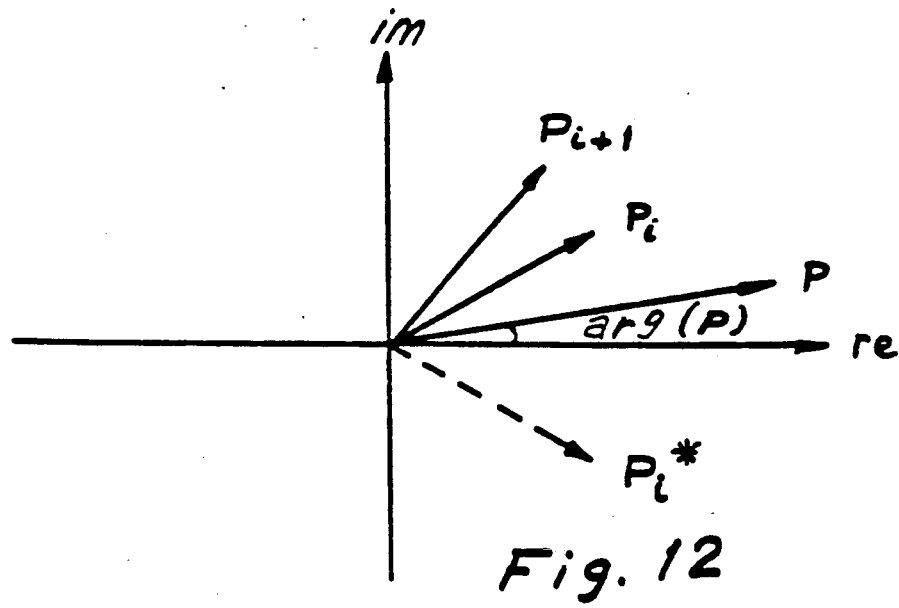
FIGS. 12 and 13 are vector diagrams.

By the following complex multiplication a further complex vector P can be defined which is shown in FIG. 12 and whose phase angle arg (P) is the difference angle $\phi$ between the vectors $P_i$ and $P_{i+1}$ (see FIG. 10):

$$P = P^*_i \cdot P_{i+1}$$
$$\phi = arg(P)$$

Figure 13:
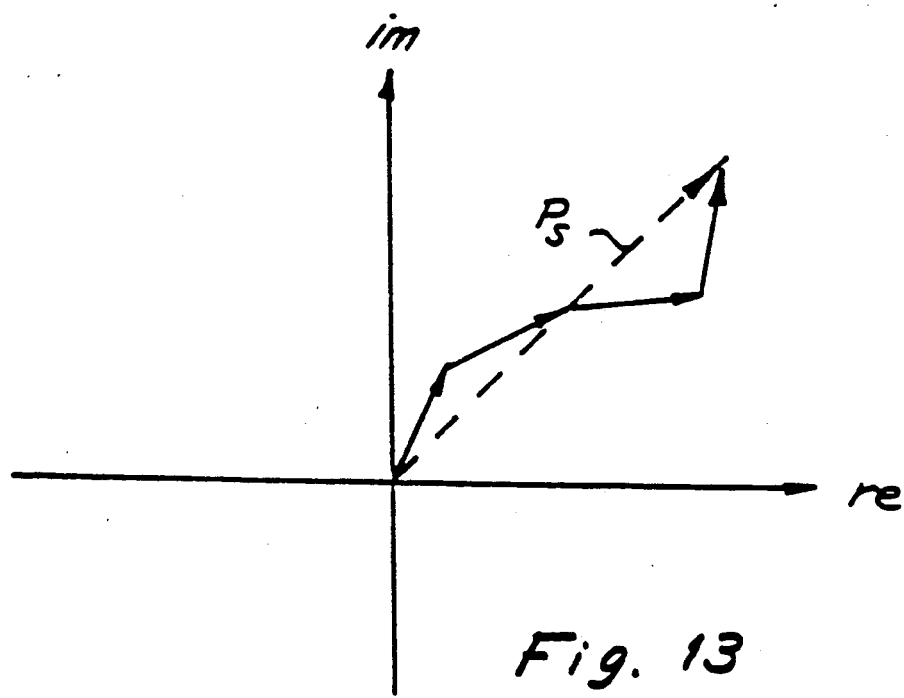

The accuracy of the calculated value of $\phi$ can be improved if, as shown in FIG. 13, an averaging of the argument of P is effected by the formation of a sum vector $P_s$ as follows:

$$P_S = \sum_N [P^*_i \cdot P_{i+1}]$$

where $P^*_i = I_i + jQ_i$.

Since $P_S$ increases considerably as N increases, it is advantageous for signal processing to use instead of $P_S$ a standardized vector $P_n$ which has the same argument as P and which is defined as follows:

$$P_n = \left(\sum_N [P^*_i \cdot P_{i+1}]\right) / \left(\sum_N |P_i|^2\right)$$

The advantage of using $P_n$ to discover $\phi$ is that the arguments of the discrete vectors P are averaged and $|P_n|$ is a measure for the correlation—i.e., for a noise-free doppler signal $|P_n|$ is 1 and for a doppler signal mixed with considerable noise $|P_n| < 1$. If system noise can be kept sufficiently low, $|P_n|$ is a measure of the turbulence of the flow under test.

For the conventional receiving system of FIG. 9 the measurement range is determined by the value of $V_{max}$ defined by the following formula:

$$V_{max} = (PRF)c/4f_o \cos \theta$$

in which:

PRF denotes the pulse repetition rate (of the transmitted pulses), $f_o$ denotes the transmission frequency, c denotes the propagation speed of the pulse, and $\theta$ denotes the angle between the beam and the direction of the flow.

The measurement range just defined is of use for systems working with only one transmit frequency. When a system uses two different transmission frequencies $f_1$, $f_2$ the corresponding phase/frequency characteristic $\phi_1 - v$ and $\phi_2 - v$ can be determined for each of the transmit frequencies in the manner shown in FIG. 14, the measurement range for each such frequency being defined by the formula hereinbefore given for $V_{max}$.

Figure 14:
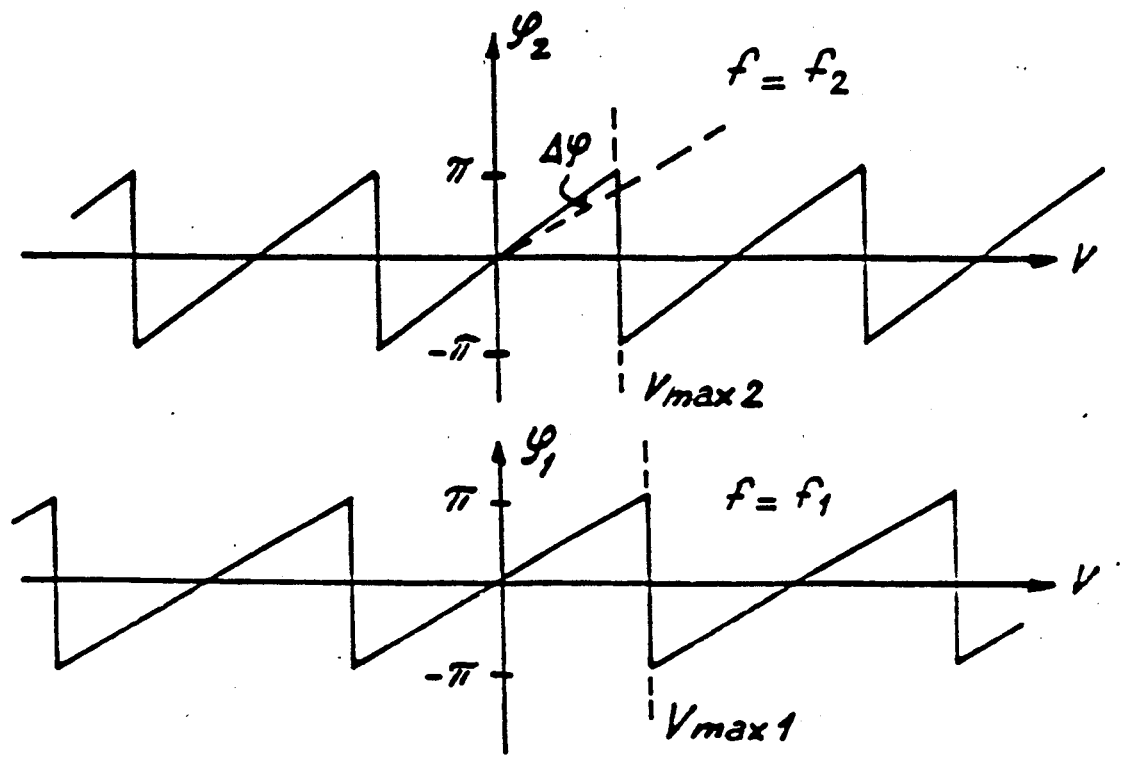
FIG. 14 shows the phase frequency characteristics of a detector according to FIG. 9 for two different transmitted frequencies $f_1$ and $f_2$.

PRF, c and cos θ are the same for the two phase/frequency characteristics shown in FIG. 14. As will be apparent therefrom, in a comparison of such characteristics— i.e., when the difference between the two characteristics is formed-a difference angle $\Delta\phi = \phi_2 - \phi_1$ can be defined which is exactly zero for $v = 0$ and which increases as v increases, the increase being correspondingly positive for $+v$ and negative for $-v$. When the extreme value $V_{max}$ is exceeded, $\Delta\phi$ is still much smaller than $\phi_1$ and $\phi_2$. If the difference angle $\Delta\phi$ is found instead of $\phi_2$ or $\phi_1$, the latter angle reaches the limit value $V_{max}$ at a value of v which can be much greater than $V_{max\,1}$ or $V_{max\,2}$. It can be shown that for the phase/frequency characteristic of $\Delta\phi$ the critical value $V_{max}$ is defined by the following formula:

$$V_{max} = (PRF)c/4(f_2 - f_1)$$

This formula shows that when the difference between $f_2$ and $f_1$ approaches zero the limit value $V_{max}$ theoretically tends towards infinity. In a practical construction, for example, a five-fold increase in $V_{max}$ for the single phase/frequency characteristic $\phi - v$ of a system using a single transmit frequency is realistic.

Figure 15:
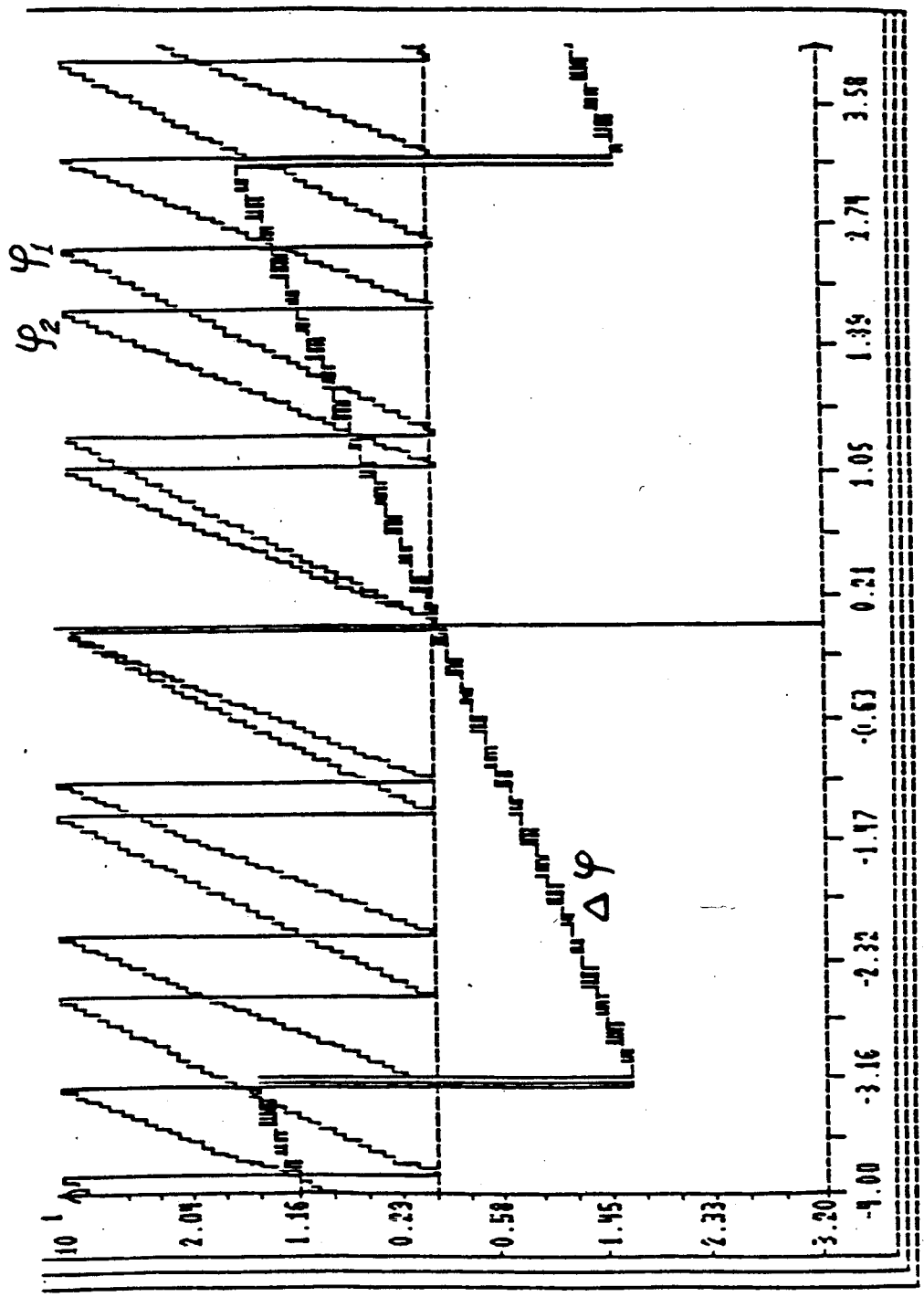
FIG. 15 shows the expanded phase frequency characteristic of a Doppler signal detector of a Doppler measuring device according to the invention operating simultaneously on two different transmit frequencies or transmit frequency bands.

The appreciable increase in the measurement range will be apparent from the representation of the phase-frequency characteristics $\phi_1$, $\phi_2$ and $\Delta\phi$ in FIG. 15. Two signal-processing paths are necessary in the receiver for this extension of the range, one path processing echoes corresponding to transmit pulses of the frequency $f_1$ while the other path processes echoes corresponding to transmit pulses of the frequency $f_2$.

A two-channel system of this kind is according to the invention provided in the receiver 16 of FIG. 1.

Figure 16:
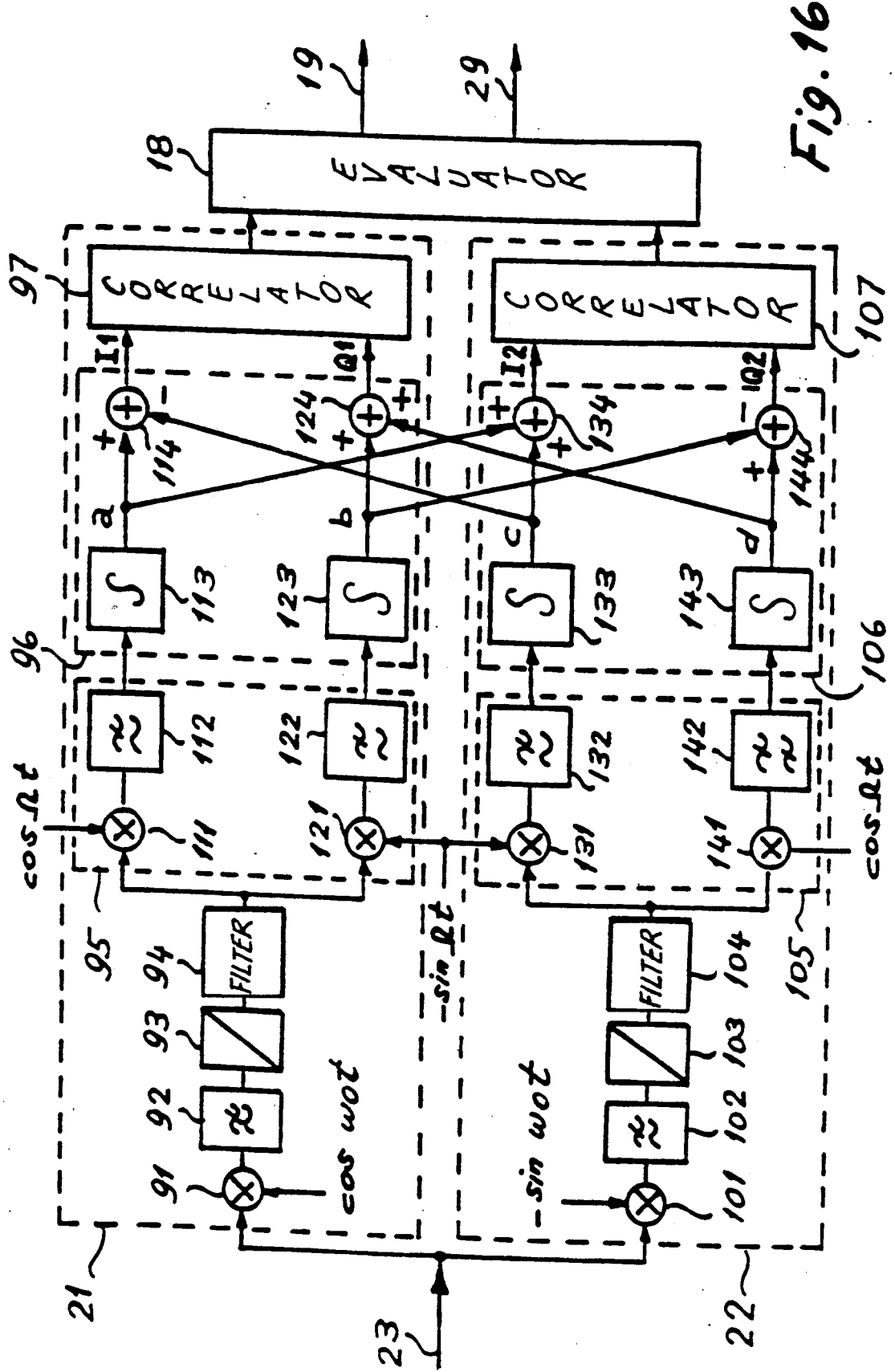
FIG. 16 is a block schematic diagram of an embodiment of the receiver 16 of FIG. 1.
Figure 17:
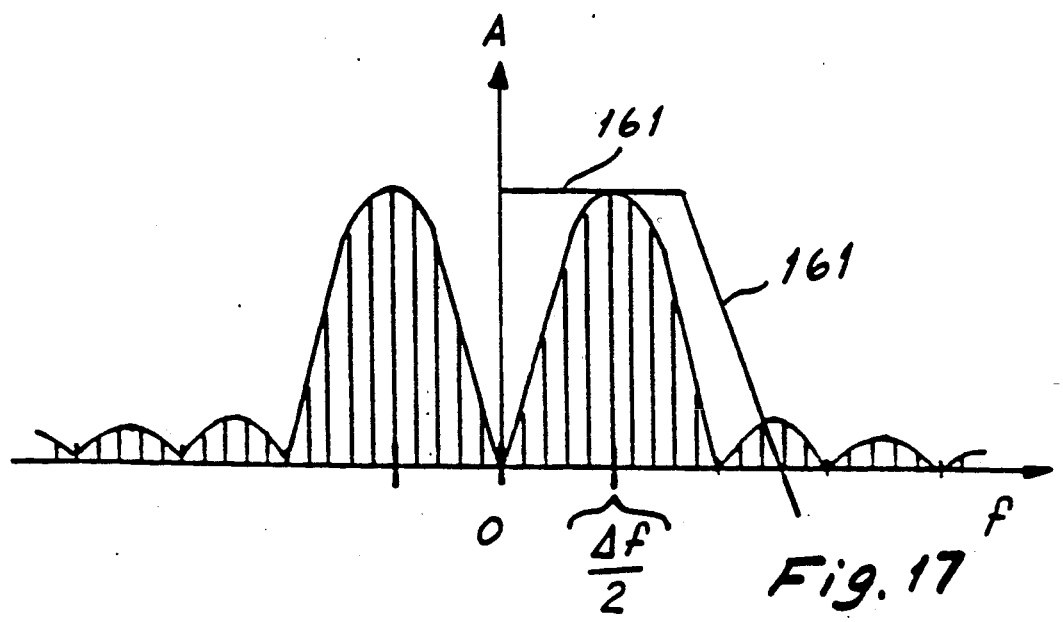
FIG. 17 shows the frequency spectrum of the output signal at the output of the low-pass filter 92 of FIG. 16.

FIG. 16 is a block schematic diagram of a preferred embodiment of the signal-processing paths 21, 22 of the receiver 16 illustrated in FIG. 1.

As shown in FIG. 2, the frequency spectrum of the transmitted signal comprises a frequency line grating having a grating distance of PRF. The suppression of the unwanted side bands is, for example, 12 dB.

This corresponds to a factor of 4—i.e, the energy content at the frequencies $f_1$ and $f_2$ is 16 times greater than the energy content at $f_2 + \Delta f$ and $f_1 - \Delta f$ respectively.

The frequency spectrum of the echo signal substantially correlates with the transmit signal frequency spectrum of FIG. 2. Like the transmit signal spectrum, therefore, the echo signal frequency spectrum is divided energy-wise between two frequency bands 31 and 32.

In the receiver 16 echo signals in frequency band 31 are processed in path 21 and echo signals in frequency band 32 in path 22. The echo signal output by the transducer 14 of FIG. 1 is supplied by way of a line 23 to the common input of the paths 21, 22.

As will be apparent from FIG. 16, the paths 21, 22 have the same basic construction and are made up of the following circuitry: analog multipliers 91, 101, low-pass filters 92, 102, analog-digital converters 93, 103, fixed-echo filters 94, 104, side band demodulators 95, 105, intergrators and side band separating circuitry 96, 106 and correlators 97, 107. The output signals of the correlators 97, 107 are the output signals of the paths 21, 22. As shown in FIGS. 1 and 16, the latter output signals are supplied to corresponding inputs of the evaluator 18. The same then outputs via a line 19 a first output signal whose timing corresponds to the velocity profile along the ultrasonic beam, the evaluator 18 also outputting by way of a line 29 a second output signal providing information about the turbulence of the measured flow.

The demodulators 95, 105 are preferably digital signal side band demodulators and are made up of the following circuitry: multipliers 111, 121, 131, 141 and low-pass filters 112, 122, 132, 142.

The integrators and side band separator circuits 96, 106 comprise the following circuitry: integrators 113, 123, 133, 143 and adders 114, 124, 134, 144.

Since the signal processing in the paths 21, 22 is very similar, the following description will describe mainly signal processing in the path 21 in detail but the description of processing in the path 22 will be limited to aspects differing from processing in the path 21.

As in the conventional receiver section described above and shown in FIG. 9, the received echo signal first undergoes quadrature demodulation in the paths 21, 22 comprising the multipliers 91, 101 and the low-pass filters 92, 102. The demodulated echo signals at the output of the filters 92, 102 are then converted by the converters 93, 103 respectively into digital signals. The fixed-echo components thereof are suppressed by the subsequent fixed-echo filters 94, 104. After the processing just described the output signal of the filter 94 has the frequency spectrum shown in FIG. 17 in the pass range 161 of the filter 92.

As can be gathered from FIG. 16, the first quadrature demodulation of the echo signal is carried out with the central frequency $f_0 = \omega_0/2\pi$ of the frequency spectrum of the transmit signal. A second quadrature demodulation is carried out in each of the demodulators 95, 105; the output signals of the filters 94, 104 respectively are modulated by a modulation frequency of $\Delta f/2$, $\Delta f$ being equal to $f_2 - f_1$ (FIG. 2).

Figure 18:
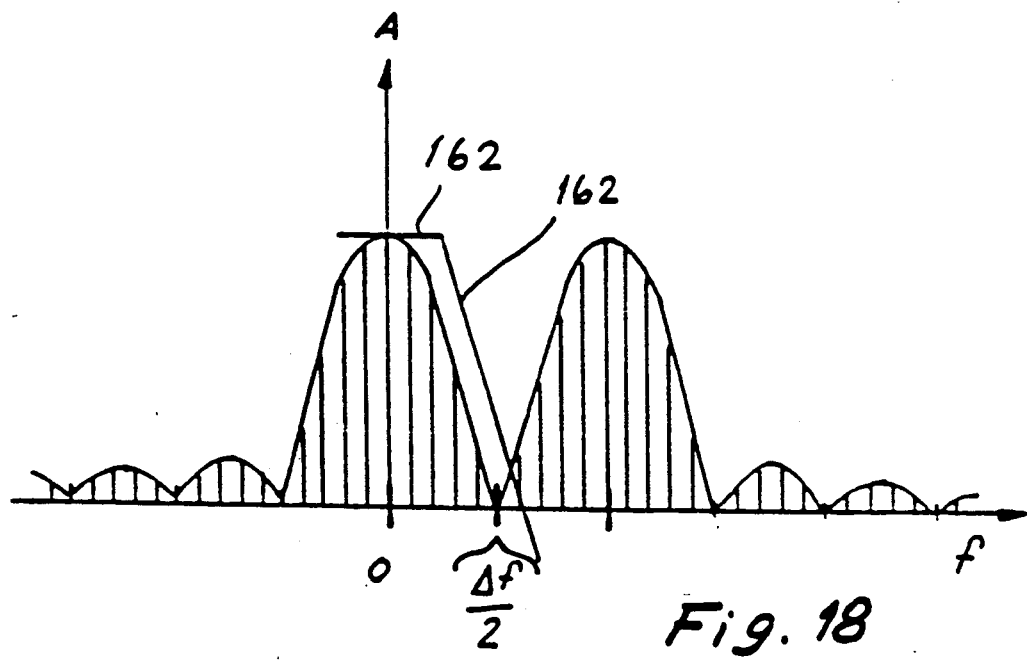
FIG. 18 shows the frequency spectrum of the output signal at the input of the low-pass filter 112 of FIG. 16.

As a result of the quadrature demodulation in the demodulator 95 an output signal whose frequency spectrum in the pass range 162 of the filter 112 is shown in FIG. 18 is produced at the output of the filter 112.

The output signals of the low-pass filters 112, 122 of the demodulator 95 are further processed in the circuit arrangement 96 where the signal noise is reduced by means of integrators 113, 123. Finally, the adders 114, 124 respectively form signal pairs $I_1$, $Q_1$, corresponding to the signal pair I, Q in the conventional receiving system of FIG. 9. The circuit arrangements 105, 106 similarly form signal pairs $I_2$, $Q_2$.

By means of the correlator 97 output signals corresponding to the argument and amount of a standardized vector $P_{n1}$ defined similarly to the vector $P_n$ are derived from the signal pairs $I_1$, $Q_1$ (see the foregoing description referring to FIGS. 9-13). The argument of the vector $P_{n1}$ is a measure of the flow velocity calculated on the basis of the echo signal in the frequency band 31 in FIG. 2. The amplitude of the standardized vector $P_{n1}$ is a measure of turbulence of the flow under test.

The correlator 107 similarly prepares from the signal pairs $I_2$, $Q_2$ output signals corresponding to the argument and amount of a standardized vector $P_{n2}$ defined similarly to the vector $P_n$. The argument of the standardized vector $P_{n2}$ is a measure of the flow velocity calculated on the basis of the echo signal in the frequency band 32 of FIG. 2. The amplitude of the standardized vector $P_{n2}$ is also a measure of the turbulence of the flow under test.

The evaluator 18 forms the difference between the arguments of the vectors $P_{n1}$ and $P_{n2}$ so that an output signal is produced whose pattern in time corresponds to the velocity profile along the ultrasonic beam. The latter output signal is delivered via the line 19.

The evaluator 18 also produces from the amplitudes of the vectors $P_{n1}$, $P_{n2}$ a signal representative of the turbulence of the flow under test. The latter signal is delivered via the line 29.

In amplification of the foregoing description of embodiments, a description will be given hereinafter of the production according to the invention of the frequency spectrum of the transmit signal and the processing according to the invention of the echo signal with reference to a mathematical representation.

The simplest way of transmitting on two frequencies simultaneously is to amplitude modulate a signal X(t) of carrier frequency $f_0$ by a signal A(t) in order to produce a modulated signal x(t) in which:

$$X(t) = A(t) \cos\omega_0 t$$
$$A(t) = \cos\Omega t.$$

This of course produces a carrier of radian frequency $\omega_0$ having an envelope curve of radian frequency $\Omega$ as shown in FIG. 8. When this function is transformed into the frequency range, a pure two-frequency signal is produced of the form:

$$x(t) = \cos\Omega t \cdot \cos\omega_0 t = \tfrac{1}{2}[\cos(\omega_0+\Omega)t + \cos(\omega_0-\Omega)t]$$

in which $\omega_0 + \Omega = 2\pi f_2$ and $\omega_0 - \Omega = 2\pi f_1$.

The signal x(t) contains no carrier component. The choice of $\Omega$ determines the difference frequency (f2−f1).

The transmit signal consists of periodic pulses of x(t). The frequency spectrum of the latter signal comprises a frequency line grating with the grating spacing 1/PRF, PRF denoting the pulse repetition rate as shown in FIG. 2.

The derivation of the signals $I_1$, $Q_1$ and $I_2$, $Q_2$ shown in FIG. 6 will be described hereinafter, the operations being affected using single frequencies instead of frequency bands in order to simplify the representation.

The received double side band signal is described by:

$$f_e(t) = 4 \cdot [\cos(\omega_0 + \Omega + \omega_{d1})t + \cos(\omega_0 - \Omega + W_{d2})t]$$

After the first quadrature demodulation at the center frequency $\omega_0$ and subsequent low-pass filtering there are yielded the signals:

$$\begin{aligned}
I_{(t)} &= \cos\omega_0 t \cdot f_{e(t)} \\
&= 4[\cos\omega_0 t \cdot \cos(\omega_0 + \Omega + \omega_{d1})t + \\
&\quad \cos\omega_0 t \cdot \cos(\omega_0 - \Omega + \omega_{d2})t] \\
&= 2[\cos(2\omega_0 + \Omega + \omega_{d1})t + \cos(\Omega + \omega_{d1})t + \\
&\quad \cos(2\omega_0 - \Omega + \omega_{d2})t + \cos(\Omega - \omega_{d2})t] \\
I_{(t)} &= 2[\cos(\Omega + \omega_{d1})t + \cos(\Omega - \omega_{d2})t] \\
Q_{(t)} &= 2[\sin(\Omega + \omega_{d1})t + \sin(\Omega - \omega_{d2})t]
\end{aligned}$$

To obtain the Doppler shifts $\omega_{d1}$ and $\omega_{d2}$ contained in the two side bands, we must demodulate the two quadrature signals $I_{(t)}$ and $Q_{(t)}$ at the side band frequency $\Omega$. The subsequent low-pass filtering and summation of the signals which are shown in FIG. 16 are obtained at the positions a, b, c and d leads to the signal pairs $I_1$, $Q_1$ and $I_2$, $Q_2$ which represents two rotating vectors of radian frequencies $\omega_{d1}$ and $\omega_{d2}$.

$$\begin{aligned}
a_{(t)} &= I_{(t)} \cdot \cos\Omega t \\
&= 2[\cos\Omega t \cdot \cos(\Omega + \omega_{d1})t + \cos\Omega t \cdot \cos(\Omega - \omega_{d2})t] \\
&= \cos(2\Omega + \omega_{d1})t + \cos\omega_{d1}t + \cos(2\Omega - \omega_{d2})t + \cos\omega_{d2}t \\
a_{(t)} &= \cos\omega_{d1}t + \cos\omega_{d2}t \\
b_{(t)} &= I_{(t)} \cdot (-\sin\Omega t) \\
&= 2[-\sin\Omega t \cdot \cos(\Omega + \omega_{d1})t - \sin\Omega t \cdot \cos(\Omega - \omega_{d2})t] \\
&= -\sin(2\Omega + \omega_{d1})t + \sin\omega_{d1}t - \sin(2\Omega - \omega_{d2})t - \sin\omega_{d2}t \\
b_{(t)} &= \sin\omega_{d1}t - \sin\omega_{d2}t \\
c_{(t)} &= Q_{(t)} \cdot (-\sin\Omega t) \\
&= 2[-\sin\Omega t \cdot \sin(\Omega t \omega_{d1})t + \sin\Omega t \cdot \sin(\Omega - \omega_{d2})t] \\
&= -\cos\omega_{d1}t + \cos(2\Omega - \omega_{d1})t + \cos\omega_{d2}t - \cos(2\Omega - \omega_{d2})t \\
c_{(t)} &= -\cos\omega_{d1}t + \cos\omega_{d2}t \\
d_{(t)} &= Q_{(t)} \cdot \cos\Omega t \\
&= 2[\cos\Omega t \cdot \sin(\Omega + _{d1})t + \cos\Omega t \cdot \sin(\Omega - \omega_{d2})t] \\
&= \sin(2\Omega + \omega_{d1})t + \sin\omega_{d1}t - \sin(2\Omega - \omega_{d2})t + \sin\omega_{d2}t \\
d_{(t)} &= \sin\omega_{d1}t + \sin\omega_{d2}t
\end{aligned}$$

Summation therefore gives:

$$\begin{aligned}
I_{1(t)} &= 1/2[a - c] = \cos\omega_{d1}t \\
Q_{1(t)} &= 1/2[b + d] = \sin\omega_{d1}t \\
I_{2(t)} &= 1/2[a + c] = \cos\omega_{d2}t \\
Q_{2(t)} &= 1/2[b - d] = \sin\omega_{d2}t
\end{aligned}$$

The complex vectors $$\begin{aligned}
P_{1i} &= I_1 + jQ_1 \\
P^*_{1i} &= I_1 + jQ_1 \\
P_{2i} &= I_2 + jQ_2 \\
P^*_{2i} &= I_2 + jQ_2
\end{aligned}$$

are defined with references to the signal pairs $I_1$, $Q_1$ and $I_2$, $Q_2$.

The $I_1$, $Q_1$ signal pairs which define vectors $P_1$, $P_{1(i+1)}$, $P_{1(i+2)}$ following one another at a time interval of 1/PRF are supplied to the correlator 97.

The $I_2$, $Q_2$ signal pairs which define vectors $P_{2i}$, $P_{2(i+1)}$, $P_{1(i+2)}$ following one another at a time interval of 1/PRF are supplied to the correlator 107.

The correlator 97 derives from $I_1$, $Q_1$ output signals corresponding to the argument or amplitude of a standardized vector $P_{n1}$, defined by $$P_{n1} = \left( \sum_N [P^*_{1i} \cdot P_{1(i+1)}] \right) \Big/ \left( \sum_N |P_{1i}|^2 \right)$$

The correlator 107 derives from $I_2$, $Q_2$ output signals corresponding to the argument or amplitude of a standardized vector $P_{n2}$ defined by $$P_{n2} = \left(\sum_N [P^*_{2i} \cdot P_{2(i+1)}]\right) / \left(\sum_N |P_{2i}|^2\right)$$

The correlator 97 supplies the evaluator 18 with signals corresponding to the argument or amplitude of vector $P_{n1}$. The correlator 107 supplies the evaluator 18 with signals corresponding to the argument or amplitude of the vector $P_{n2}$.

By formation of the difference between the signals corresponding to the argument of $P_{n1}$ and to the argument of $P_{n2}$ the evaluator 18 forms an output signal whose pattern in time corresponds to the flow velocity profile along the transmitted ultrasonic beam. This signal is delivered via the line 19.

The fact that the difference between arguments of $P_{n1}$ and $P_{n2}$ is proportional to the flow velocity will be apparent from the following mathematical representation in which for the sake of simplification a continuous transmitted signal is used instead of transmitted pulses.

The Doppler frequency $f_d$ is of course given by the formula:

$$f_d = (2v \cos \theta) f_O / c$$

where $\theta$ denotes the angle between the flow direction and the ultrasonic beam, or simply $$f_d = 2 v f_O / c$$

if the factor $\cos \theta$ is taken as unity since it is irrelevant.

On the basis of the definition $\omega = \Delta\phi/\Delta t$ the Doppler frequency is $$f_d = (1/2\pi)(\Delta\phi/\Delta t)$$

where $\Delta t$ is the pulse repetition period 1/PRF, so that $\Delta\phi$ can be derived:

$$\Delta\phi = f_O(2v/c) 2\pi \Delta t$$

If $f_1 = f_O - \Delta f$ and $f_2 = f_O$ are defined, therefore:

$$\phi_1 = f_1 (2v/c) 2\pi \Delta t$$
$$\phi_2 = f_2 (2v/c) 2\pi \Delta t$$

These equations describe the phase/frequency characteristics shown in FIGS. 14 and 15, $\phi_1$, denoting the argument of the vector $P_{n1}$ and $\phi_2$ the argument of the vector $P_{n2}$.

By forming the difference between the arguments of these vectors a difference angle $\Delta\phi$ can be determined as:

$$\Delta\phi = (f_2 - f_1)(2v/c) 2\pi \Delta t$$

As will be apparent from this expression, $\Delta\phi$ is proportional to v.

When periodic transmitted pulses—i.e., a sampled system—are used the limit given by the sampling theorem for detectable values of v lies where $\Delta\phi = \pm\pi$. Consequently, $|v_{max}|$ becomes:

$$v_{max} = c/[4(f_2 - f_1)\Delta t]$$

when $\cos \theta = 1$ or with $\Delta t = 1/PRF$ $$v_{max} = (PRF) [c/4(f_2 - f_1)]$$

As will be apparent from this expression, the measurement range defined by $v_{max}$ can be made as large as required by an appropriate choice of $f_1$ and $f_2$.

What is claimed is:

1. A Doppler measuring device to measure flow velocity of a fluid which carries particles which reflect ultrasonic waves comprising:

transmitter means for producing transmit pulses at a predetermined pulse repetition rate, said transmit pulses having a periodic sequence with a frequency spectrum of at least two adjacent but separate frequency bands;

ultrasonic transducer means connected to the transmitter means for receiving said transmit pulses which excite the transducer means to produce corresponding ultrasonic wave pulses to irradiate the fluid and thereby the particles carried by the fluid and to produce at least two groups of corresponding echo waves, the echo waves being received by the ultrasonic transducer means and delivered as corresponding echo signals;

receiver means connected to the ultrasonic transducer means and having an input end, an output end, and separate signal processing paths for receiving the echo signals from the ultrasonic transducer means and for processing adjacent but separate frequency bands of the echo signals in each of the separate signal processing paths to produce Doppler information; and evaluator means connected to the output end of the receiver means for evaluating the echo signals received from the receiver means to determine the flow velocity of the fluid; wherein the transmitter means comprises:

a first shift register having an input end, an output end and memory cells, the output end being connected to the input end of the first shift register;

a second shift register having an input end, an output end and memory cells, the memory cells corresponding in number to a number of the memory cells in the first shift register, and the output end being connected to the input end of the second shift register;

loading means connected to the first and the second shift registers for loading each of the shift registers with the same number of words of equal length and for loading complementary bits in corresponding memory cells of each of the registers;

a timing unit connected to each of the shift registers to produce timing signals to cause a shift of contents in each of the registers over a predetermined period of time to produce corresponding output signals at the output ends of each of the first and second shift registers; and a power amplifier having an input and an output, the input of the amplifier being connected to the output ends of the first and the second shift registers, and the amplifier producing an output signal which is supplied as the transmit pulses to the transducer means, the output signal being formed as a difference between output signals produced by each of the shift registers.

2. A Doppler measuring device to measure flow velocity of a fluid which carries particles which reflect ultrasonic waves comprising:

transmitter means for producing transmit pulses at a predetermined pulse repetition rate, said transmit pulses having a periodic sequence with a frequency spectrum of at least two adjacent but separate frequency bands;

ultrasonic transducer means connected to the transmitter means for receiving said transmit pulses which excite the transducer means to produce corresponding ultrasonic wave pulses to irradiate the fluid and thereby the particles carried by the fluid and to produce at least two groups of corresponding echo waves, each echo waves being received by the ultrasonic transducer means and delivered as corresponding echo signals;

receiver means connected to the ultrasonic transducer means and having an input end, an output end, and separate signal processing paths for receiving the echo signals from the ultrasonic transducer means and for processing adjacent but separate frequency bands of the echo signals in each of the separate signal processing paths to produce Doppler information; and evaluator means connected to the output end of the receiver means for evaluating the echo signals received from the receiver means to determine the flow velocity of the fluid; wherein the transmitter means comprises:

amplitude modulator means for modulating a high frequency carrier signal to produce an output signal with suppression of the carrier signal; and a controllable gate circuit to produce impulses of the output signal.

3. A Doppler measuring device to measure a flow velocity of a fluid which carries particles which reflect ultrasonic waves comprising:

transmitter means for producing transmit pulses at a predetermined pulse repetition rate, said transmit pulses having a periodic sequence with a frequency spectrum of at least two adjacent but separate frequency bands;

ultrasonic transducer means connected to the transmitter means for receiving said transmit pulses which excite the transducer means to produce corresponding ultrasonic wave pulses to irradiate the fluid and thereby the particles carried by the fluid and to produce at least two groups of corresponding echo waves, each echo waves being received by the ultrasonic transducer means and delivered as corresponding echo signals; receiver means connected to the ultrasonic transducer means and having a input end, an output end, and separate signal processing paths for receiving the echo signals from the ultrasonic transducer means and for processing adjacent but separate frequency bands of the echo signals in each of the separate signal processing paths to produce Doppler information; and evaluator means connected to the output end of the receiver means for evaluating the echo signals received from the receiver means to determine the flow velocity of the fluid; wherein each of the signal-processing paths of the receiver means comprises a first quadrature demodulation stage consecutively connected to a second quadrature demodulation stage.

4. The device according to claim 3, wherein the second quadrature demodulation stage is a digital single side band demodulator.

* * * * *